United States Patent
Fedyk

(10) Patent No.: US 10,447,601 B2
(45) Date of Patent: Oct. 15, 2019

(54) LEAF-TO-SPINE UPLINK BANDWIDTH ADVERTISEMENT TO LEAF-CONNECTED SERVERS

(71) Applicant: Hewlett Packard Enterprise Development LP, Houston, TX (US)

(72) Inventor: Donald Fedyk, Andover, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 34 days.

(21) Appl. No.: 15/789,447

(22) Filed: Oct. 20, 2017

(65) Prior Publication Data

US 2019/0123961 A1 Apr. 25, 2019

(51) Int. Cl.
*H04L 12/803* (2013.01)
*H04L 12/24* (2006.01)
*H04L 12/911* (2013.01)
*H04L 12/44* (2006.01)

(52) U.S. Cl.
CPC ........ *H04L 47/125* (2013.01); *H04L 41/0826* (2013.01); *H04L 47/783* (2013.01); *H04L 47/822* (2013.01); *H04L 47/829* (2013.01); *H04L 12/44* (2013.01)

(58) Field of Classification Search
CPC . H04L 41/0826; H04L 47/783; H04L 47/822; H04L 12/44
See application file for complete search history.

(56) References Cited

U.S. PATENT DOCUMENTS

| | | |
|---|---|---|
| 7,254,626 B1 | 8/2007 | Kommula et al. |
| 7,774,492 B2 * | 8/2010 | Raphel .................... H04L 47/10 370/229 |
| 8,787,154 B1 * | 7/2014 | Medved .................. H04L 45/64 370/225 |
| 9,178,801 B1 * | 11/2015 | Guichard ............ H04L 12/6418 |
| 9,307,018 B2 | 4/2016 | DeCusatis et al. |
| 9,413,668 B2 | 8/2016 | Venkataswami et al. |
| 9,792,106 B1 * | 10/2017 | Kommula ................. G06F 8/65 |
| 9,813,356 B1 * | 11/2017 | Kim ........................ H04L 45/44 |

(Continued)

OTHER PUBLICATIONS

Al-Fares, M. et al, "Hedera: Dynamic Flow Scheduling for Data Center Networks", Published in: Proceeding NSDI'10 Proceedings of the 7th USENIX conference on Networked systems design and implementation, San Jose, California—Apr. 28-30, 2010, online < http://www.cs.duke.edu/courses/compsci590.4/fall13/838-CloudPapers/hedera.pdf >, 15 pp.

(Continued)

*Primary Examiner* — Tejis Daya
(74) *Attorney, Agent, or Firm* — Michael A. Dryja

(57) ABSTRACT

A system includes spine network switching devices, leaf network switching devices, and server computing devices. The leaf network switching devices are not connected to one another. Each leaf network switching device is connected to each spine network switching device. Each server computing device is connected to each leaf network switching device. Each leaf network switching device transmits an advertisement indicating uplink bandwidth to each spine network device. Each server computing device distributes network traffic through the leaf network switching devices to the spine network switching devices based on the uplink bandwidth that the leaf network switching devices advertise.

17 Claims, 7 Drawing Sheets

(56) References Cited

U.S. PATENT DOCUMENTS

| | | | | |
|---|---|---|---|---|
| 2010/0254652 | A1* | 10/2010 | Kirkpatrick | H04Q 11/0005 385/17 |
| 2010/0254703 | A1* | 10/2010 | Kirkpatrick | H04Q 11/0005 398/45 |
| 2010/0257646 | P1* | 10/2010 | Amrhein | A01H 5/0887 |
| 2011/0078303 | A1 | 3/2011 | Li et al. | |
| 2011/0238817 | A1* | 9/2011 | Okita | H04L 41/142 709/224 |
| 2013/0336164 | A1* | 12/2013 | Yang | H04L 47/125 370/255 |
| 2014/0101302 | A1* | 4/2014 | Yang | H04L 41/0813 709/224 |
| 2015/0180769 | A1* | 6/2015 | Wang | H04L 45/38 370/236 |
| 2016/0011925 | A1* | 1/2016 | Kulkarni | H04L 43/0817 714/57 |
| 2017/0026461 | A1 | 1/2017 | Boutros et al. | |
| 2017/0063631 | A1* | 3/2017 | Curtis | H04L 41/12 |
| 2017/0126475 | A1* | 5/2017 | Mahkonen | H04L 43/04 |
| 2017/0295100 | A1 | 10/2017 | Hira et al. | |
| 2018/0062930 | A1* | 3/2018 | Dhesikan | H04L 41/0896 |

OTHER PUBLICATIONS

Pete Bratach: "Routing on the Host—Routing on the Host—Cumulus Networks", Jan. 12, 2017 (Jan. 12, 2017), XP055564750, Retrieved from the Internet: URL:https://docs.cumulusnetworks.com/display/ROH/Routing+on+the+Host [retrieved on Mar. 5, 2019], 4 pages.

* cited by examiner

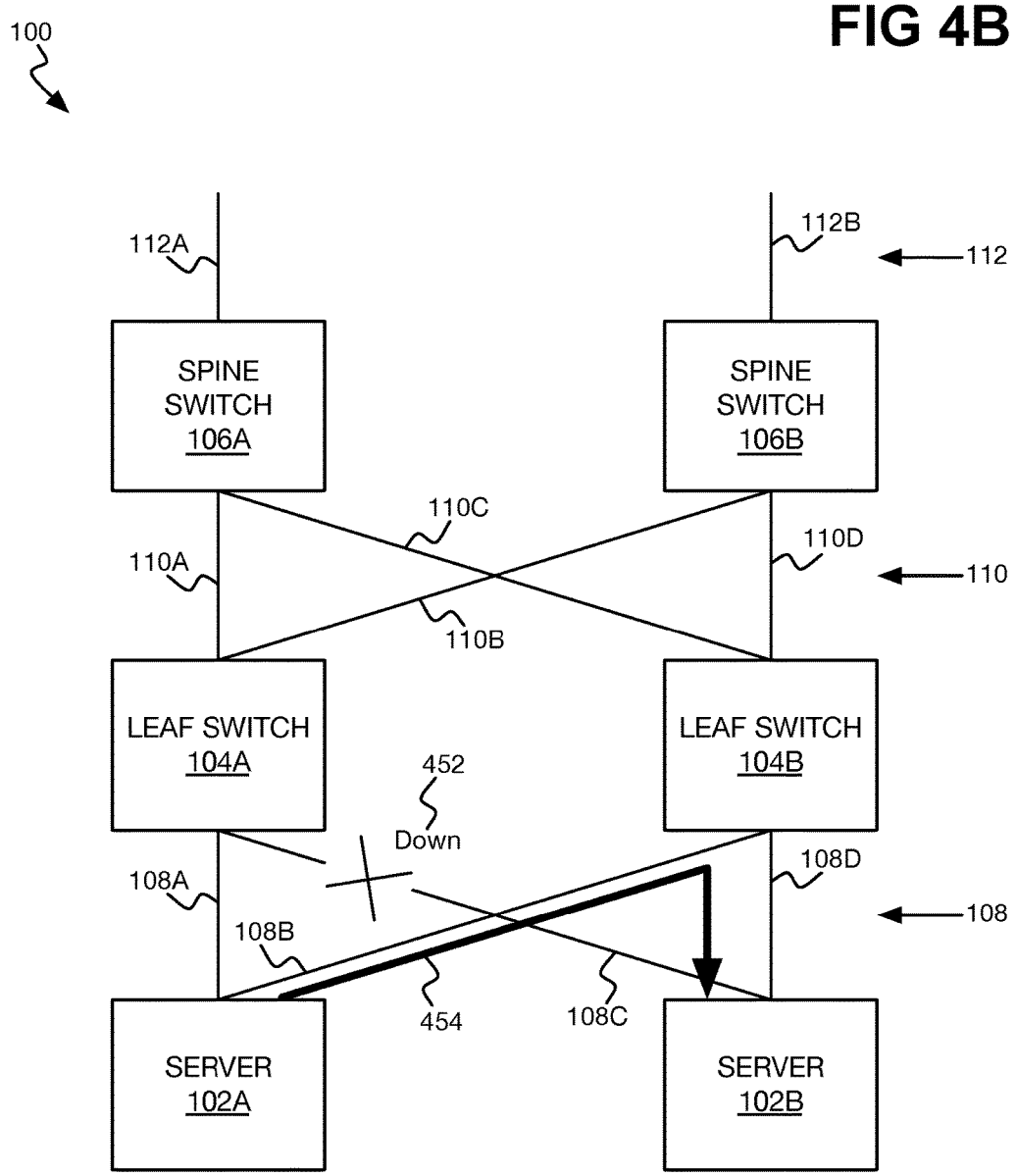

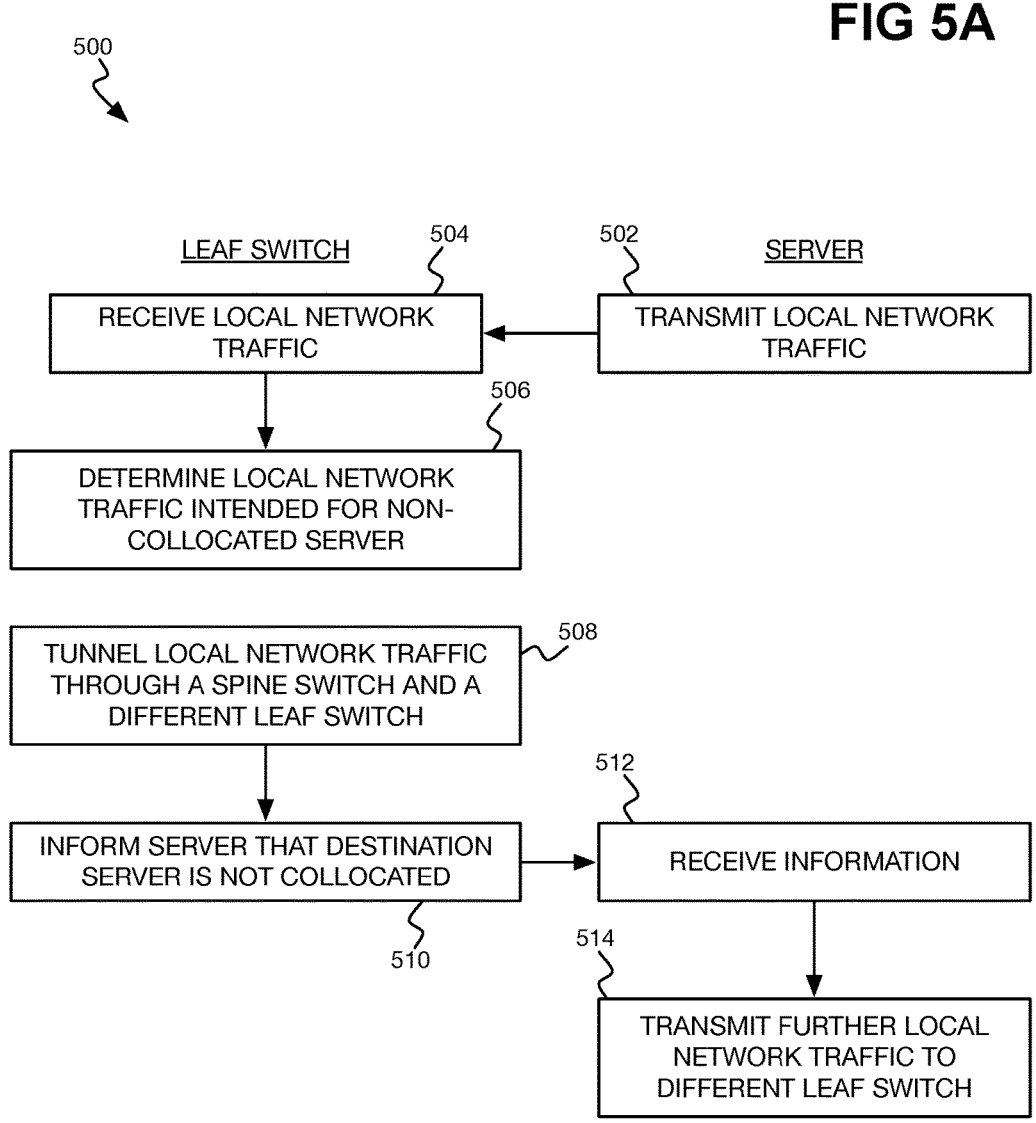

LEAF-TO-SPINE UPLINK BANDWIDTH ADVERTISEMENT TO LEAF-CONNECTED SERVERS

BACKGROUND

An enterprise datacenter or other computing environment can include a large numbers of server computing devices, or servers, which are interconnected with one another as well as with other computing devices external to the datacenter. Such servers can provide the computational hardware foundation on which enterprise and other software runs, to permit an organization to run smoothly. The computing devices may be communicatively connected with one another within the datacenter via a number of network switching devices, or network switches.

BRIEF DESCRIPTION OF THE DRAWINGS

FIG. 4B is a diagram of example performance of the method of FIG. 4A.

FIG. 5A is flowchart of another example method for local network traffic between servers within the system of FIG. 1.

DETAILED DESCRIPTION

Figure 1:
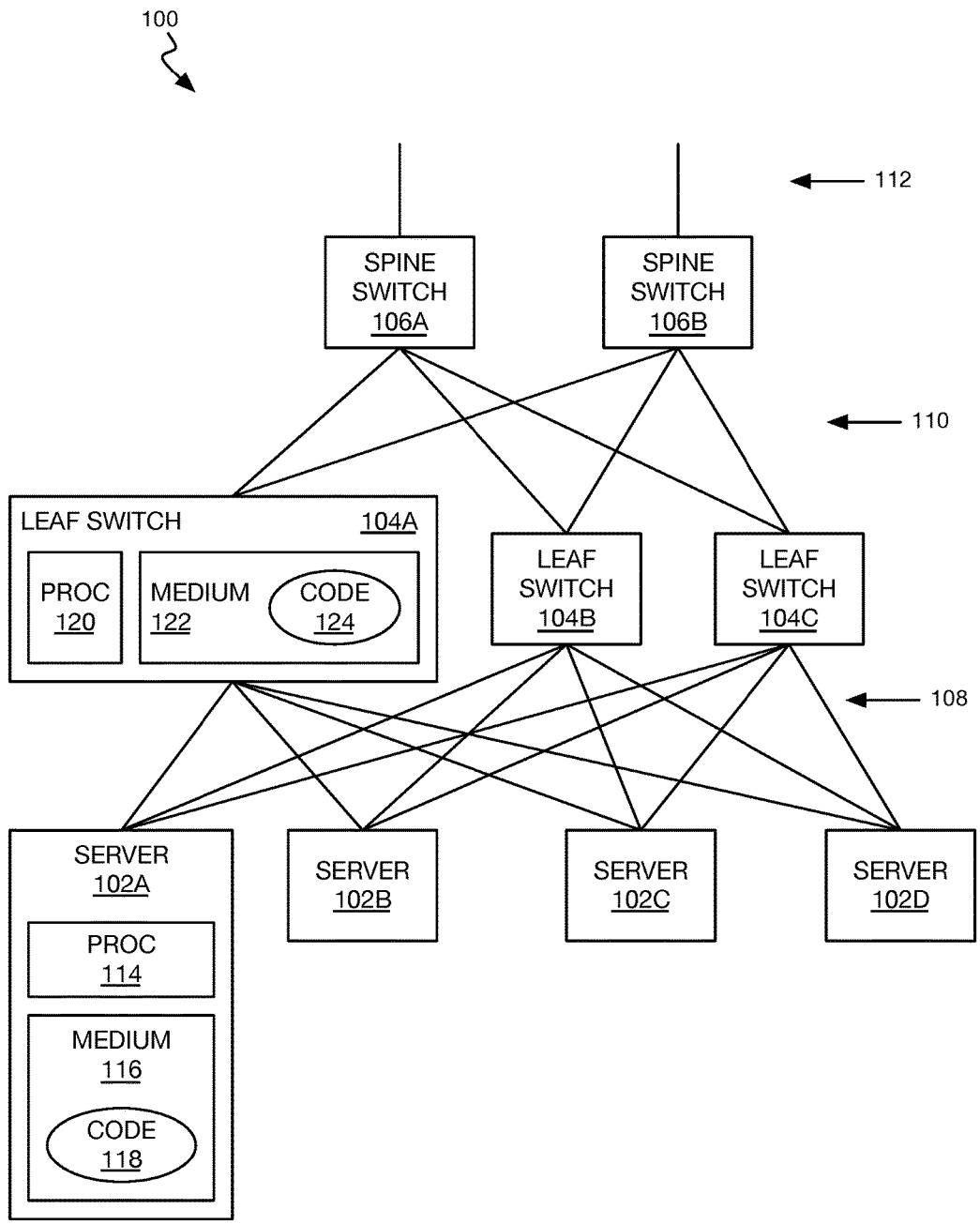
FIG. 1 is a diagram of an example system having a spine-and-leaf network architecture in which the leaf network switches do not have to be directly physically interconnected for network traffic distribution.

As noted in the background section, an enterprise datacenter or other computing environment can include a large number of servers that are interconnected to one another via network switches. One type of network architecture for a datacenter is the spine-and-leaf architecture. In this architecture, lower-tier leaf network switches, such as top of rack (ToR) and end of row (EoR) network switches, each connect to a number of servers (or other devices within the datacenter). Upper-tier spine network switches are connected to the lower-tier leaf network switches in a hub-and-spoke topology, and the spine switches may then connect the datacenter as a whole to or other, higher level spine switches or to external networks, including other datacenters.

The servers, which connect to multiple (such as usually two) leaf switches, may be aggregated within a link group so that the server treats the leaf switches as a single switch. These leaf network switches are adjacently connected to one another, to permit load distribution roughly equal to each leaf switch. This distribution can provide several features, such as load balancing, quality of service classification, and traffic shaping, but treats the bandwidth to the leafs roughly equal regardless of the capacity of the leaf switches to the rest of the network. As such, compensating for imbalances within network traffic on uplinks between the leaf network switches and the spine network switches occurs at the leaf switch level. If one leaf network switch's uplink to a spine network switch is oversubscribed, for instance, then the leaf switch may send traffic received from a server to another leaf switch to send to the spine switch if there is sufficient inter-leaf network switch connections.

The inter-leaf network switch connections, which multichassis link aggregation (MC-LAG, or MLAG) peer link connections, use leaf switch port capacity. There is a tradeoff that when these ports are used for this purpose they consume port bandwidth that could be utilized elsewhere for uplink capacity to the spine. Indeed, as a datacenter scales, more leaf network switch ports may have to be dedicated for inter-leaf switch connections, to maintain a desired ratio of inter-leaf switch bandwidth to leaf switch-to-spine network switch bandwidth, although such links may not be used except in cases of imbalance. For instance, to ensure reasonable bandwidth resiliency, the former bandwidth may have to be at least half of the latter bandwidth. Such reservation of leaf network switch ports for inter-leaf switch connection is therefore costly, using resources that may be better deployed for other purposes.

Techniques described herein innovatively remove the adjacent physical connections between leaf network switches within a spine-and-leaf architecture, while still permitting equal load distribution and other network functions to occur. Specifically, responsibility for such network traffic distribution is pushed down to the servers from the leaf network switches. That is, the servers make decisions as to how to distribute traffic to the leaf network switches in a ratio that reflects the bandwidth from the leaf to the spine network switches, instead of the leaf network switches being the arbiters. To provide the servers with sufficient information to distribute network traffic, the leaf network switches advertise to the servers their uplink bandwidth to each spine network switch. A leaf network switch's ports that were previously reserved for inter-leaf switch connection can thus be deployed for other purposes such as more uplink capacity that can be utilized all the time.

FIG. 1 shows an example system 100 having a spine-and-leaf architecture. The system 100 may be a datacenter of an enterprise, for instance. The system 100 includes servers, or server computing devices, 102A, 102B, 102C, and 102D, which are collectively referred to as the servers 102. The server 102A is depicted in representative detail of the servers 102 as including in one implementation a processor 104 and a non-transitory computer-readable data storage medium 116 storing program code 118. The processor 104 can execute the code 108 to perform functionality described later in the detailed description.

The system 100 includes leaf switches, or leaf network switching devices, 104A, 104B, and 104C, which are collectively referred to as the leaf switches 104. The leaf switch 104A is depicted in representative detail of the leaf switches 104 as including in one implementation a processor 120 and a non-transitory computer-readable data storage medium 122 storing program code 124 that the processor 120 can execute to perform functionality described later in the detailed description. The system 100 includes spine switches, or spine network switching devices, 106A and 106B, which are collectively referred to as the spine switches 106. There are four servers 102, three leaf switches 104, and two spine switches 106 in the example of FIG. 1, but more generally there can be any number of servers 102, leaf switches 104, and spine switches 106.

The servers 102 provide the computational hardware on which software can be executed, so that the system 100 can perform the functionality for which it has been deployed within an enterprise or other organization. Each server 102 is physically connected to at least two leaf switches 104, as indicated in FIG. 1 as physical connections 108 between the servers 102 and the leaf switches 104. More generally, each server 102 may be physically connected to more than two leaf switches 104, such as to three leaf switches 104 in the specific example of FIG. 1. Such physical connections between each server 102 and each leaf switch 104 can be effected by one or more network cables may be physically connected to one or more network ports of the server 102 in question and to one or more corresponding network ports of the leaf switch 104 in question. The servers 102 are not directly physically connected to one another, and are not directly physically connected to the spine switches 106.

The bandwidth between a server 102 and a leaf switch 104 is referred to herein as local bandwidth of the server 102 to the leaf switch 104. The servers 102 can have the same or different bandwidth to the leaf switches 104 over the physical connections 108. For example, the server 102A may usually have the same local bandwidth to each leaf switch 104, but may have a different local bandwidth to one of the leaf switches 104. As another example, the servers 102 may each have the same local bandwidth to the leaf switch 104A, or one or more of the servers 102 may have a different local bandwidth to the leaf switch 104A.

The leaf switches 104 are lower-tier leaf hardware network switches within the network topology of FIG. 1. As noted above, such lower-tier leaf network switches can include Top of Rack (ToR) and End of Rack (EoR) switches. In addition to being physically connected to pairs of servers 102, each leaf switch 104 can usually be physically connected to every spine switch 106, as indicated in FIG. 1 as physical connections 110 between the leaf switches 104 and the spine switches 106. That is, between each leaf switch 104 and each spine switch 106, one or more network cables may be physically connected to one or more network ports of the leaf switch 104 in question and to one or more corresponding network ports of the spine switch 106 in question.

In one implementation, as explicitly depicted in FIG. 1, the leaf switches 104 are not directly physically connected to one another. That is, in the techniques described herein, there can be no MC-LAG/MLAG peer link connections, or other inter-leaf switch 104 physical connections. As such, the finite number of physical network ports of each leaf switch 104 can wholly be deployed for connecting to the servers 102 and the spine switches 106. This means that each leaf switch 104 can connect to a greater number of servers 102 and/or spine switches 106 than if some network ports were reserved for peer link connections with other leaf switches 104. In another implementation, however, the leaf switches 104 may be connected with some link bandwidth directly between them, but that link bandwidth can be insufficient for protecting the loss of leaf-to-spine uplink bandwidth.

The bandwidth between a leaf switch 104 and a spine switch 106 is referred to herein as uplink bandwidth of the leaf switch 104 to the spine switch 106, at least to distinguish this bandwidth over the connections 110 from the bandwidth over the server-to-leaf switch connections 108. The leaf switches 104 can have the same or different bandwidth to the spine switches 106 over the physical connections 110. For example, the leaf switch 104A can usually have the same uplink bandwidth to each spine switch 106, but may have a different uplink bandwidth to the spine switch 106A as compared to that to the spine switch 106B. As another example, the leaf switches 104 may both have the same uplink bandwidth to the spine switch 106A, or the leaf switch 104A may have a different uplink bandwidth to the spine switch 106A than the leaf switch 104B does, which may occur just in certain circumstances, such as during network upgrades or outages.

The spine switches 106 are upper-tier spine hardware network switches within the network topology of FIG. 1. In addition to being physically connected to each leaf switch 104, each spine switch 106 can be physically connected to an external network outside of the system 100, as indicated in FIG. 1 as physical connections 112 that extend from the spine switches 106. That is, one or more network cables may be physically connected to one or more network ports of each spine switch 106 and external networks outside the system 100, such as other datacenters or private site locations of an enterprise, the wider Internet, and so on. The spine switches 106 are not directly physically connected to one another, nor to the servers 102.

The bandwidth of a spine switch 106 on its physical connection 112 from the system 100 is referred to as external bandwidth of the spine switch 106, at least to distinguish this bandwidth over the connections 112 from the bandwidth over the connections 110 and the bandwidth over the connections 108. The spine switches 106 can have the same or different bandwidth from the system 100. Furthermore, the spine switches 106 may be connected to the same or different external networks.

The bandwidth on each of the physical connections 108, 110, and 112 may largely be static, depending on the performance characteristics of the servers 102, the leaf switches 104, and the spine switches 106, as well as on the number and type of cables effecting the connections 108, 110, and 112. However, availability of each of the local bandwidth, the uplink bandwidth, and the external bandwidth can dynamically change, depending on network traffic and other conditions. For example, the availability of the uplink bandwidth between the leaf switch 104A and the spine switch 106A may decrease when this link is oversubscribed, and then may increase as network traffic decreases between the switches 104A and 106A. As another example, the availability of the local bandwidth between the server 102A and the leaf switch 104A may drop to no availability if this link fails, and then rise when the physical connection 108 between the server 102A and the leaf switch 104A is repaired.

Figure 2:
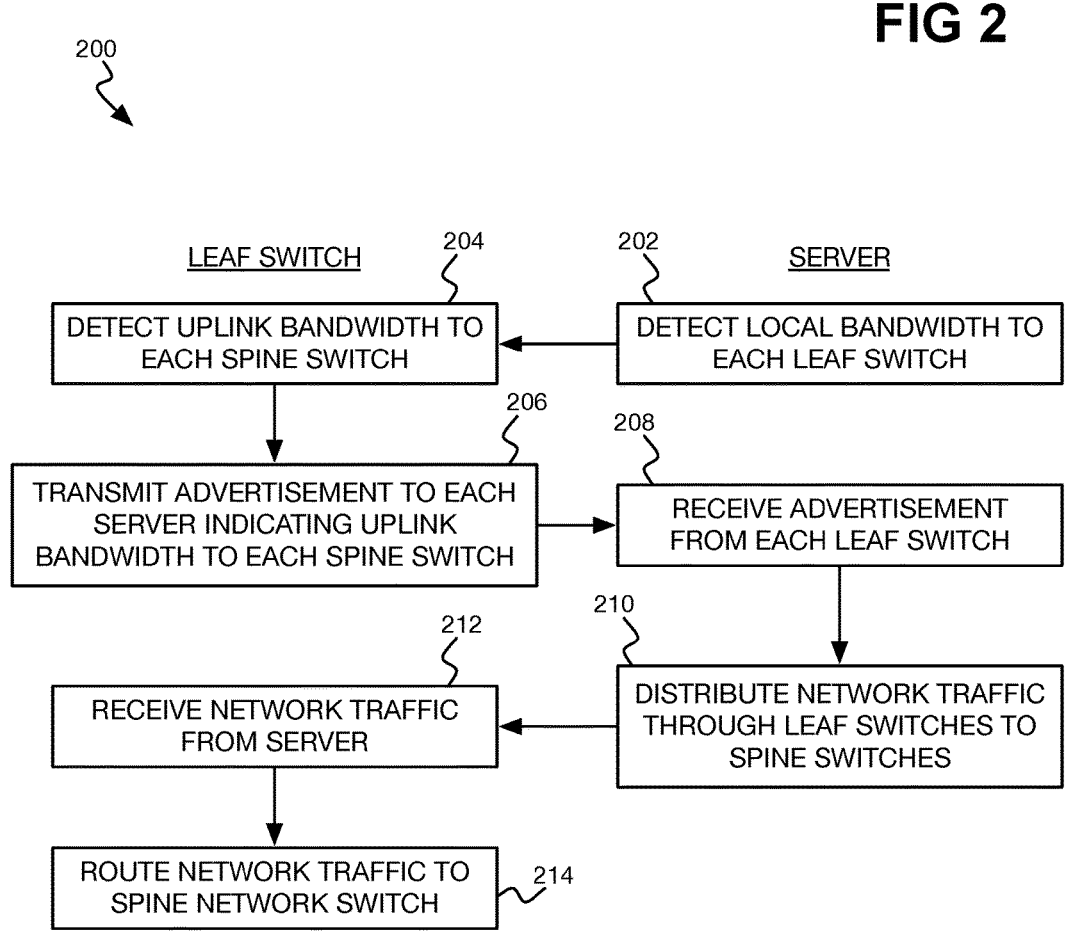
FIG. 2 is a flowchart of an example method for distributing server-to-spine network switch network traffic within the system of FIG. 1.

FIG. 2 shows an example method 200 for distributing network traffic within the system 100, in which the leaf switches 104 are not interconnected to one another. The left side of the method 200 is performed by each leaf switch 104, and the right side by each server 102. The method 200 may be implemented as program code stored on a non-transitory computer-readable data storage medium and executable by a processor. A processor of a leaf switch 104 can thus execute program code stored on a data storage medium thereof to perform the left side of the method 200. A processor of a server 102 can execute program code stored on a data storage medium thereof to perform the right side of the method 200.

Each server 102 can detect its local bandwidth over the connections 108 to each leaf switch 104 (202). More specifically, each server 102 dynamically detects this local bandwidth, since the availability of the local bandwidth can change. Each leaf switch 104 similarly detects its uplink bandwidth over the connections 110 to each spine switch 106 (204). More specifically, each leaf switch 104 dynamically detects this uplink bandwidth, since the availability of the uplink bandwidth can change.

Each leaf switch 104 transmits an advertisement to each server 102 to which it is connected indicating its uplink bandwidth to each spine switch 106 (206). A leaf switch 104 may dynamically transmit advertisements to the servers 102 advertising its uplink bandwidth to a given spine switch 106 as availability of this uplink bandwidth changes. The advertisement can be direct, or indirect through software-defined networking (SDN). The advertisement can be in the form of a link layer discovery protocol (LLDP) advertisement capability. The advertisement can also be provided out-of-band. For instance, a protocol message, such as an MC-LAG/MCLAG control message, can be transported over a user datagram protocol (UDP) or transmission control protocol (TCP) or other tunnel. Such a protocol permits messages between the leaf switches to aggregate a link and also handle data between the two leaf switches as if there were a direct physical connection between the two switches. The techniques described herein reduce the data traffic on such a tunneled link.

An advertisement can include the identity of a leaf switch 104 transmitting the advertisement, such as its media access control (MAC) address or its Internet protocol (IP) address. The advertisement includes the identity of a spine switch 106 to which the advertisement pertains. The advertisement includes the uplink bandwidth, such as the current availability thereof as dynamically detected, between the transmitting leaf switch 104 and the identified spine switch 106.

In one implementation, the communication links between the servers 102 and the leaf switches 104 may be implemented as a layer two (L2) network, whereas the communication the links between the leaf switches 104 and the spine switches are implemented either also as an L2 network or as a layer three (L3) network. In the former case, the system 100 can be considered as an L2 network, whereas in the latter case, the system can be considered as an L2/L3 (or L3/L2) network. In other implementations, the links between the servers 102 and the leaf switches 104 may be implemented as an L3 network, where the links between the leaf switches and the spine switches are implemented either also as an L3 network or as an L2 network.

Each server 102 receives the advertisements sent by each leaf switch 104 (208). A server 102 then distributes its network traffic through the leaf switches 104 to the spine switches 106 based on the uplink bandwidth received in the received advertisements, and may also distribute this network traffic based on the local bandwidth to each leaf switch 104 (210). A server 102 may distribute such outgoing network traffic from the system 100 using a link aggregation technique or another technique that adjusts for the leaf uplink capacity. The servers 102 thus perform most of the load distribution, instead of the leaf switches 104. The servers 104 can perform such load distribution because they receive the uplink bandwidth between the leaf switches 104 and the spine switches 106. Without this information, the servers 104 cannot optimally perform load distribution. Network traffic distribution in this respect can include network traffic balancing.

Distributing outgoing network traffic can be achieved on a network flow-by-network flow basis, such as at the frame level in the case of implementation of the method 200 as to the L2 network of the system 100, and at the packet level in the case of implementation of the method 200 as to the L3 or L3/L2 network of the system 100. Such distributing can include making a determination as to which leaf switch 104 to send particular network traffic, and a determination as to which spine switch 106 to include as the next-hop address of this network traffic. A leaf switch 104 may actively or passively determine the next spine switch 106 for forwarding the traffic from a server 102.

Therefore, as a server 102 distributes network traffic, meaning that the server 102 sends the traffic to a specific leaf switch 104 it selected, which receives such traffic (212) with traffic then being sent to the spine switch 106 by the leaf switch 104 (214) in the ratio that the server 102 intended. The leaf switch 104 is capable of making this determination. In this way the initial network traffic distribution is moved from the leaf switch level to the server level and the leaf switch 104 follows the same logic. As such, the leaf switches 104 do not have to be physically interconnected, since they do not have to distribute network traffic among themselves.

Figure 3:
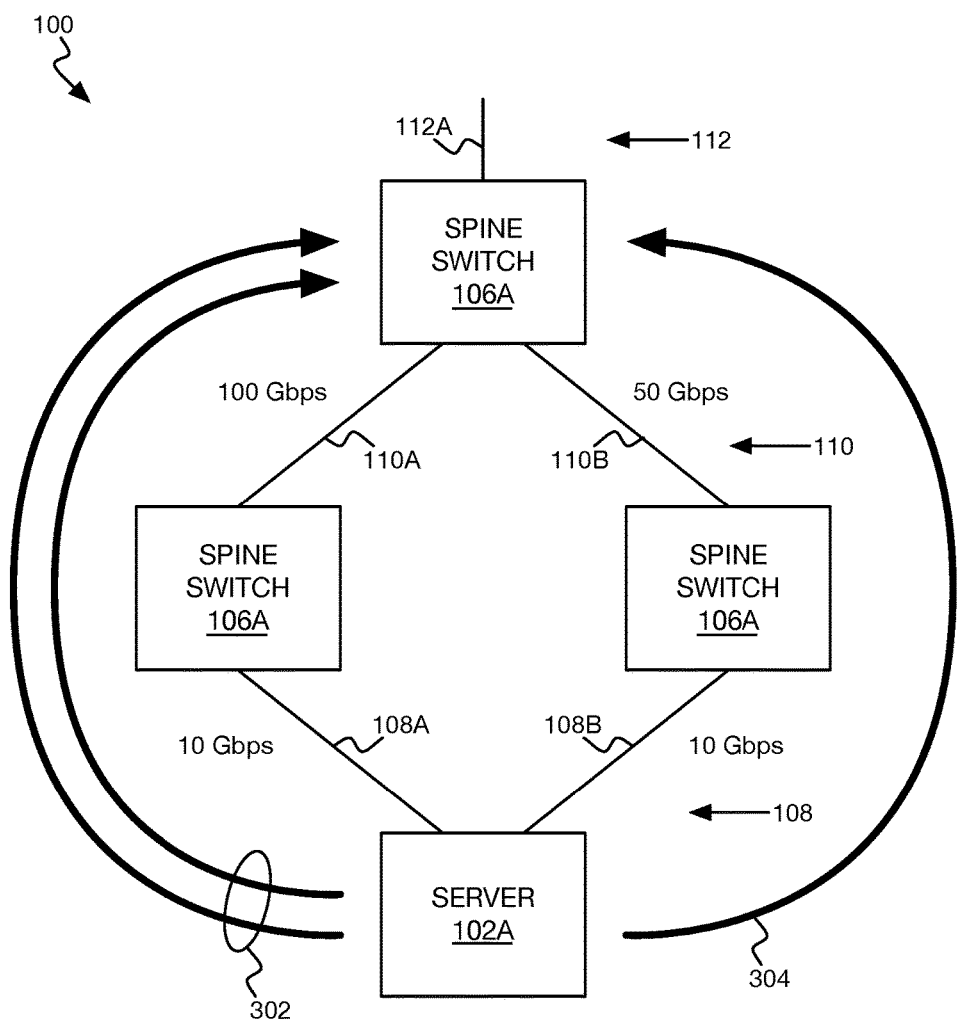
FIG. 3 is a diagram of example performance of the method of FIG. 2.

FIG. 3 illustratively depicts example performance of the method 200. A portion of the system 100 is shown. Specifically, the portion of the system 100 that is shown includes the server 102A, both leaf switch 104, and the spine switch 106A. The physical connections 108 from the server 102A to the leaf switches 104 include the physical connection 108A to the leaf switch 104A at a local bandwidth of ten gigabits per second (Gbps) and the physical connection 108B to the leaf switch 108 at the local bandwidth of ten Gbps as well. The physical connections 110 to the spine switch 106A from the leaf switches 104 include the physical connection 110A to the spine switch 106A at the uplink bandwidth of one-hundred Gbps in FIG. 3A, and the physical connection 110B to the spine switch 106B at the uplink bandwidth of fifty Gbps in FIGS. 3A and 3B. Leaf-to-spine bandwidth is thus proportionally unequal; even though this uplink bandwidth is much larger than the server-to leaf-bandwidth of each server 102, the latter bandwidth is shared by multiple servers 102 and therefore is a potential network traffic bottleneck.

In FIG. 3, the server 102A can distribute network traffic to the spine switch 106A and out the system 100 at the spine switch 106A by sending twice as much network traffic 302 through the leaf switch 104A to the spine switch 106A than network traffic 304 through the leaf switch 104B to the spine switch 106B. Assuming that there is no network traffic congestion on the physical connections 110, in other words, because the uplink bandwidth of the connection 110A is twice that of the connection 110B, the server 102A sends twice as much network traffic on the connection 110A than on the connection 110B. The local bandwidth of the connections 108 does not affect load balancing, because the local bandwidth of the connection 108A is equal to that of the connection 108B. The server 102A can distribute the network traffic to the spine switch 106A in this respect because it has knowledge of the uplink bandwidth between the leaf switches 104 and the spine switch 106A from the advertisements that the leaf switches 104 transmitted upon initial detection of their uplink bandwidth.

Figure 4A:
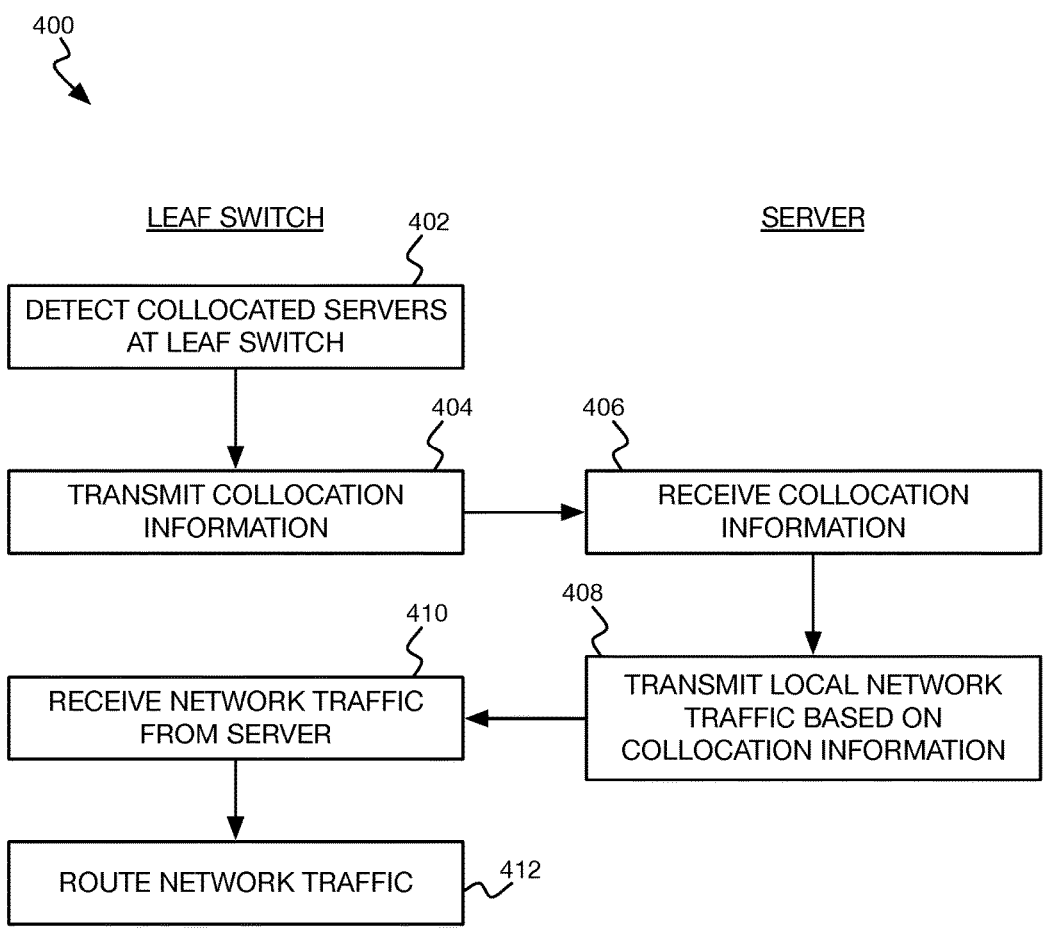
FIG. 4A is flowchart of an example method for local network traffic between servers within the system of FIG. 1.

FIG. 4A shows an example method 400 for local network traffic within the system 100, in which the leaf switches 104 are not interconnected to one another. The left side of the method 400 is performed by each leaf switch 104, and the right side by each server 102. The method 400 may be implemented as program code stored on a non-transitory computer-readable data storage medium and executable by a processor. A processor of a leaf switch 104 can thus execute program code stored on a data storage medium thereof to perform the left side of the method 400. A processor of a server 102 can execute program code stored on a data storage medium thereof to perform the right side of the method 400.

Each leaf switch 104 detects the servers 102 that are collocated at the leaf switch 104 in question (402). The servers 102 that are collocated at a leaf switch 104 are those servers 102 that have available physical connections 108 to the leaf switch 104. Each leaf switch 104 dynamically detects the servers 102 that are collocated, since the availability of the physical connections 108 between the servers 102 and the leaf switch 104 can change.

Each leaf switch 104 transmits collocation information to each server 102 to which it is connected (404). The collocation information of a leaf switch 104 includes the identity of each server 102 to which the leaf switch 104 has an available physical connection 108. This collocation information can be in the form of an IP message when the method 400 is implemented at an L3 network level within the system 100 or at an L3/L2 network level. The collocation information can be provided as an LLDP message or an out-of-band message when the method 400 is implemented at an L2 network level. The collocated servers 102 in the former case may be identified by IP address, and in the latter case by MAC address.

Each server 102 receives the collocation information from the leaf switches 104 to which it is connected (406). A server 102 then transmits local network traffic based on the received collocation information (408). Local network traffic is inter-server 102 network traffic, as opposed to network traffic that is sent to a spine switch 106 for transmission out of the system 100. The server 102 transmits local network traffic based on collocation information instead of just transmitting the local network traffic to any leaf switch 104 to which it is connected (for instance, based on just local bandwidth considerations), because the leaf switches 104 are not physical interconnected.

More specifically, the lack of physical connections among the leaf switches 104 mean that they cannot route inter-server 102 network traffic themselves. If a leaf switch 104 receives local network traffic from one server 102 that is intended for another server 102 that is not physically connected to the leaf switch 104, the leaf switch 104 cannot just send the local network traffic to another leaf switch 104 that is physically connected to the intended server 102, due to the lack of such leaf switch 104 interconnections. Rather, the leaf switch 104 that receives the local network traffic has to transmit the traffic to a spine switch 106 to which it and another leaf switch 104 that is physically connected to the intended server 102. The spine switch 106 then sends the local network traffic to the latter leaf switch 104, which sends the local network traffic to the intended server 102. This scenario introduces undesired latency, however, due to the addition of network hops.

When a server 102 transmits to a leaf switch 104 local network traffic intended for another server 102, therefore, the leaf switch 104 receives this network traffic (410). The leaf switch 104 then routes, or sends, the network traffic to the intended server 102 (412). If the intended server 102 is directly connected to the leaf switch 104, then the leaf switch 104 can directly send the network traffic to the intended server 102. Otherwise, as has been described, the leaf switch 104 has to send the network traffic to another leaf switch 104 that is connected to the intended server 102, through a commonly connected spine switch 106, with the latter leaf switch sending the network traffic to the intended server 102.

FIG. 4B illustratively depicts example performance of the method 400. A portion of the system 100 is shown, including the servers 102A and 102B, the leaf switches 104A and 104B, and both spine switches 106. The physical connections 108 include the physical connections 108A and 108B from the server 102A to the leaf switches 104A and 104B, respectively. The physical connections 108 include the physical connections 108C and 108D from the server 102B to the leaf switches 104A and 104B, respectively. The physical connection 108C is down (i.e., has failed), as indicated by reference number 452.

The physical connections 110 include the physical connections 110A and 110B from the leaf switch 104A to the spine switches 106A and 106B, respectively. The physical connections 110 include the physical connections 110C and 110D from the leaf switch 104B to the spine switches 106A and 106B, respectively. The physical connections 112 include the physical connections 112A and 112B outside the system 100 from the spine switches 106A and 106B, respectively.

Each leaf switch 104 may initially send collocation information to each server 102 indicating that both servers 102 are connected to the leaf switch 104. However, at the time the physical connection 108C between the leaf switch 104A and the server 102B fails, the leaf switch 104A dynamically sends collocation information to the servers 102 that remain connected to the leaf switch 104A, including the server 102A, that the server 102B is no longer connected to the leaf switch 108A. Therefore, when the server 102A sends local network traffic 454 to the server 102B, the server 102A purposefully chooses to send the local network traffic 454 through the leaf switch 104B instead of through the leaf switch 104A, so that the local network traffic 454 can reach the server 102B without having to hop upwards to a spine switch 106.

If the server 102A were instead to send local network traffic intended for the server 102B to the leaf switch 104A, the leaf switch 104A could not directly send such local network to the server 102B. Therefore, the leaf switch 104A would have to send the network traffic to a spine switch 106 to route to the leaf switch 104B and ultimately to the server 102B. Such routing would introduce latency due to two extra hops: the hop from the leaf switch 104A to a spine switch 106, and the hop from the spine switch 106 to the leaf switch 104B.

FIG. 5A shows another example method 500 for local network traffic within the system 100, in which the leaf switches 104 are not interconnected to one another. The left side of the method 500 is performed by a leaf switch 104, and the right side by a server 102. The method 500 may be implemented as program code stored on a non-transitory computer-readable data storage medium and executable by a processor. A processor of the leaf switch 104 can thus execute program code stored on a data storage medium thereof to perform the left side of the method 500. A processor of the server 102 can execute program code stored on a data storage medium thereof to perform the right side of the method 500.

The server 102 is referred to as a source server, and transmits local network traffic intended for a destination server 102 to a leaf switch 104 (502), which receives this network traffic (504). The leaf switch 104 determines that the local network traffic, however, is intended for a non-collocated server 102 (506). That is, the destination server 102 is not collocated at the leaf switch 104. Therefore, the leaf switch 104 can tunnel the network traffic through a spine switch 106 to a different leaf switch 104 that is connected to the destination server 102 (508). The leaf switch 104 also informs the source server 102 that the destination server 102 of the local network traffic is not collocated (510). The source server 102 receives this information (512), and subsequently transmits further local network traffic to a different leaf switch 104 (514), which may be one at which both the source and destination servers 102 are collocated.

A difference between the method 400 and the method 500, then, is that in the method 400, a source server 102 receives collocation information from each leaf switch 104 ahead of time, prior to sending local network traffic to a destination server 102. Therefore, the source server 102 is unlikely to select a leaf switch 104 through which to route local network traffic to a destination server 102 that is not physically connected to the destination server 102. By comparison, in the method 500, the source server 102 receives (collocation) information from a leaf switch 104 just after it has sent local network traffic to a destination server 102, when the destination server 102 is not collocated at the leaf switch 104 in question. Therefore, the source server 102 is more likely to initially select a leaf switch 104 through which to route local network traffic to a destination server 102 that is not physically connected to the destination server 102, because the source server 102 does not have any collocation information at that time.

Figure 5B:
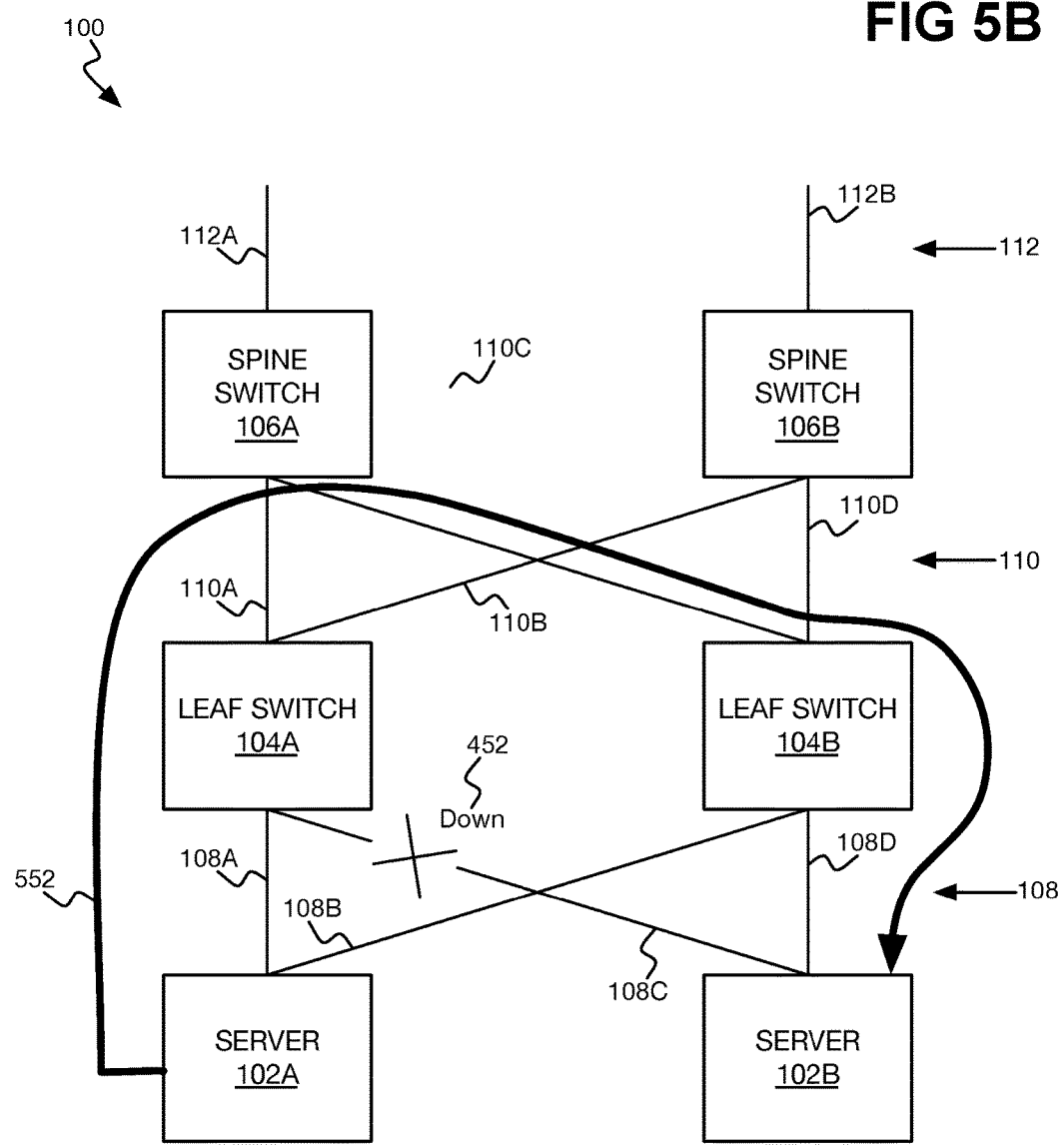
FIG. 5B is a diagram of example performance of the method of FIG. 5A.

FIG. 5B illustratively depicts example performance of the method 500. A portion of the system 100 is shown, including the servers 102A and 102B, the leaf switches 104A and 104B, and both spine switches 106. The physical connections 108 include the physical connections 108A and 108B from the server 102A to the leaf switches 104A and 104B, respectively. The physical connections 108 include the physical connections 108C and 108D from the server 102B to the leaf switches 104A and 104B, respectively. The physical connection 108C is down (i.e., has failed), as indicated by reference number 452.

The physical connections 110 include the physical connections 110A and 110B from the leaf switch 104A to the spine switches 106A and 106B, respectively. The physical connections 110 include the physical connections 110C and 110D from the leaf switch 104B to the spine switches 106A and 106B, respectively. The physical connections 112 include the physical connections 112A and 112B outside the network 110 from the spine switches 106A and 106B, respectively.

The server 102A has selected the leaf switch 104A through which to route local network traffic 552 intended for the server 102B. The server 102A does not have knowledge that the server 102B is not currently collocated at the leaf switch 104A. Therefore, when the leaf switch 104A receives this local network traffic 552, it cannot directly send the network traffic 552 to the server 102B. Rather, the leaf switch 104A has to send the network traffic 552 through a spine switch 106 to a leaf switch 104 to which the server 102B is physically connected.

In the example of FIG. 5B, the leaf switch 104A tunnels the local network traffic 552 received from the server 102A and intended for the server 102B through the spine switch 106A to the leaf switch 104B, which then sends the network traffic 552 to the server 102B. The leaf switch 104A also informs the server 102A that it does not have an available physical connection to the server 102B. The server 102A can subsequently send further local network traffic to the server 102B through another leaf switch 104, such as the leaf switch 104B, as has been described in relation to FIG. 4B.

The techniques that have been described permit network traffic distribution and to occur within a spine-and-leaf network architecture even when the leaf switches are not directly interconnected with one another. This is achieved by the leaf switches advertising their uplink bandwidth to their connected servers. The servers can then distribute network traffic, instead of the leaf switches.

I claim:

1. A method comprising:
   receiving, by a server computing device from each leaf network switching device of a plurality of leaf network switching devices to which the server computing device is physically connected, an advertisement indicating uplink bandwidth of the leaf network switching device to each spine network switching device of a plurality of spine network switching devices to which the leaf network switching device is connected;
   receiving, by the server computing device from each leaf network switching device, information as to a plurality of other server computing devices collocated at the leaf network switching device;
   transmitting, by the server computing device, local network traffic to each other server computing device through one of the leaf network switching devices at which the other server computing device is collocated with the server computing device; and
   distributing, by the server computing device, network traffic through the leaf network switching devices to the spine network switching devices based on the uplink bandwidth of each leaf network switching device to each spine network switching device.

2. The method of claim 1, wherein the leaf network switching devices are not physically connected to one another.

3. The method of claim 1, further comprising:
   detecting, by the server computing device, local bandwidth between the server computing device and each leaf network switching device,
   wherein the server computing device distributes the network traffic through the leaf network switching devices to the spine network switching devices further based on the local bandwidth between the server computing device and each leaf network switching device.

4. The method of claim 3, wherein the server computing device dynamically detects availability of the local bandwidth between the server computing device and each leaf network switching devices, as the availability of the local bandwidth changes.

5. The method of claim 1, wherein the server computing device dynamically receives the information from each leaf network switching device, as the information changes.

6. The method of claim 1, further comprising:
   transmitting, by the server computing device, local network traffic to a first different server computing device through a first leaf network switching device of the leaf network switching devices at which the first different server computing device is not collocated with the different server computing device;
   receiving, by the server computing device from the first leaf network switching device, information that the first different server computing device is not collocated at the first different server computing device; and
   responsively transmitting, by the server computing device, further local network traffic to the first different server computing through a second leaf network switching device of the leaf network switching devices.

7. The method of claim 1, wherein the server computing device dynamically receives the advertisement from each leaf network switching device, as availability of the uplink bandwidth of the leaf network switching device to any spine network switching device changes.

8. A system comprising:
a plurality of spine network switching devices;
a plurality of leaf network switching devices that are not connected to one another, each leaf network switching device connected to each spine network switching device, each leaf network switching device to transmit an advertisement indicating uplink bandwidth to each spine network device; and
a plurality of server computing devices, each server computing device connected to each leaf network switching device, each server computing device to distribute network traffic through the leaf network switching devices to the spine network switching devices based on the uplink bandwidth that the leaf network switching devices advertise; wherein each network switching device is to receive local network traffic from the server computing devices, and responsive to determining that the local network traffic pertains to non-collocated server computing devices, inform the server computing devices that the local network traffic pertains to the non-collocated server computing devices.

9. The system of claim 8, wherein each server computing device is further to detect local bandwidth between the server computing device and each leaf network switching device,
wherein the server computing device is to distribute the network traffic through the leaf network switching devices to the spine network switching devices further based on the local bandwidth between the server computing device and each leaf network switching device.

10. The system of claim 8, wherein each leaf network device is further to dynamically transmit information as to the server computing devices collocated at the leaf network switching device, as the information changes,
and wherein each server computing device is further to transmit local network traffic to a different server computing device of the server computing devices through one of the leaf network switching devices at which the different server computing device is collocated with the server computing device.

11. The system of claim 8, wherein each leaf network switching device is to dynamically transmit the advertisement indicating availability of the uplink bandwidth as the availability of the uplink bandwidth to any spine network switching device changes.

12. The system of claim 8, wherein server computing device-leaf network switching device communication occurs within a layer two (L2) network, and leaf network switching device-spine network switching device communication occurs within an L2 network,
and wherein each leaf network switching device is a lower-tier network switch, and each spine network switching device is an upper-tier network switch.

13. The system of claim 8, wherein server computing device-leaf network switching device communication occurs within a layer three (L3) network, and leaf network switching device-spine network switching device communication occurs within a layer two (L2) network,
and wherein each leaf network switching device is a lower-tier network switch, and each spine network switching device is an upper-tier network switch.

14. The system of claim 8, wherein server computing device-leaf network switching device communication occurs within a layer two (L2) network, and leaf network switching device-spine network switching device occurs within a layer three (L3) network,
and wherein each leaf network switching device is a lower-tier network switch, and each spine network switching device is an upper-tier network switch.

15. A non-transitory computer-readable data storage medium storing program code executable by a leaf network switching device to:
detect uplink bandwidth between the leaf network switching device and each spine network switching device of a plurality of spine network switching devices to which the leaf network switching device is connected and to which a plurality of other leaf network switching devices are connected, wherein the plurality of the other leaf network switching devices are not connected to the leaf network switching device;
transmit an advertisement indicating the uplink bandwidth between the leaf network switching device and each spine network switching device, to each server computing device of a plurality of server computing devices to which the leaf network switching device is connected;
receive network traffic from the server computing devices that is distributed based on the uplink bandwidth between the leaf networking switching device and each spine network switching device indicated in the advertisement sent to each server computing device; and
route the received network traffic to the spine network switching devices.

16. The non-transitory computer-readable data storage medium of claim 15, wherein the program is code is executable by the leaf network switching device to further:
dynamically transmit to each server computing device information as to the server computing devices collocated at the leaf network, as the information changes, on which basis the server computing devices distribute local network traffic to the leaf network switching device.

17. The non-transitory computer-readable data storage medium of claim 15, wherein the program is code is executable by the leaf network switching device to further:
receive local network traffic from a source server computing device to which the leaf network switching device is connected;
determine that a destination server computing device of the local network traffic is not connected to the leaf network switching device;
responsively tunneling the local network traffic to the destination server computing device through one of the spine network switching devices to which the leaf network switching device is connected and to which another leaf network switching device connected to the destination server computing device is connected; and
inform the source server computing device that the destination server computing device is not collocated at the leaf network switching device.

* * * * *